United States Patent [19]

Phelps

[11] Patent Number: 4,857,739

[45] Date of Patent: Aug. 15, 1989

[54] PACKET PERSONAL RADIATION MONITOR

[75] Inventor: James E. Phelps, Knoxville, Tenn.

[73] Assignee: United States Department of Energy, Washington, D.C.

[21] Appl. No.: 176,010

[22] Filed: Mar. 31, 1988

[51] Int. Cl.⁴ .................................................. G01T 1/18
[52] U.S. Cl. .................................... 250/388; 250/374; 250/387
[58] Field of Search ................ 250/388, 387, 386, 374

[56] References Cited

U.S. PATENT DOCUMENTS

| | | | |
|---|---|---|---|
| 3,715,593 | 2/1973 | McGunigle | 250/374 |
| 3,984,690 | 10/1976 | Marshall, III et al. | 250/374 |
| 4,191,886 | 3/1980 | Basso et al. | 250/376 |
| 4,588,892 | 5/1986 | Kopp | 250/388 |
| 4,596,933 | 6/1986 | Waechter et al. | 250/388 |
| 4,617,680 | 10/1986 | Johnston | 250/388 |
| 4,721,857 | 1/1988 | Kronenberg | 250/374 |
| 4,772,793 | 9/1988 | Larson et al. | 250/374 |

*Primary Examiner*—Janice A. Howell
*Assistant Examiner*—William F. Rauchholz

*Attorney, Agent, or Firm*—David E. Breeden; Stephen D. Hamel; Judson R. Hightower

[57] ABSTRACT

A personal radiation monitor of the chirper type is provided for detecting ionizing radiation. A battery powered high voltage power supply is used to generate and apply a high voltage bias to a G-M tube radiation sensor. The high voltage is monitored by a low-loss sensing network which generates a feedback signal to control the high voltage power supply such that the high voltage bias is recharged to +500 VDC when the current pulses of the sensor, generated by the detection of ionizing radiation events, discharges the high voltage bias to +450 VDC. During the high voltage recharge period an audio transducer is activated to produce an audible "chirp". The rate of the "chirps" is controlled by the rate at which the high voltage bias is recharged, which is proportional to the radiation field intensity to which the sensor is exposed. The chirp rate sensitivity is set to be approximately 1.5 (chirps/min/MR/hr.). The G-M tube sensor is used in a current sensing mode so that the device does not paralyze in a high radiation field.

5 Claims, 2 Drawing Sheets

PACKET PERSONAL RADIATION MONITOR

This invention, which is a result of a contract with the United States Department of Energy, relates generally to ionizing radiation detection instrumentation and more specifically to chirper-type personal radiation monitors.

BACKGROUND OF THE INVENTION

Chirper-type personal radiation monitors (PRMs) are required to be worn by personnel working near high radiation areas such as around nuclear reactors, particle accelerators, criticality areas, etc. These devices are intended to warn personnel entering an ionizing radiation field by means of audible chirps generated at a rate proportional to the field intensity. In the normal chirper-type PRM, a Geiger-Muller (G-M) tube is normally used as the radiation detection element due to its wide range of sensitivity to ionizing radiation. The G-M tube requires the application of a high voltage, typically in the range of 400–1,000 volts, between the anode and cathode electrodes of the ionizing gas filled tube. Thus, chirper-type instruments for PRM applications employ various high voltage generating schemes which generate the required high voltage from a low voltage battery source. Typically, the battery is used to power an oscillator whose output pulses are applied to the primary of a high turns ratio, step-up transformer whose secondary is connected to a voltage-multiplier circuit to obtain the required regulated high voltage bias which is constantly applied to the G-M tube to maintain the selected high-voltage operating bias. The G-M tube is connected in series with a high value load resistor in the megohm range to limit the ionization current flow. The voltage pulses produced across the load resistor in response to ionization current pulses generated in the G-M tube upon detection of ionizing radiation events are capacitance coupled into a pulse counting circuit which registers the pulses and activates an audio transducer to produce an audible chirp when a selected number of pulses are counted corresponding to the number of detected ionizing events. Normally, these counting circuits employ pulse amplitude discrimination to prevent system noise generated pulses from interfering with true radiation event counting. One problem with this type of chirper, in addition to the battery drain required due to maintain the high voltage bias at a fixed regulated value, is that the circuit becomes paralyzed due to the relatively long recovery period of the G-M tube following the detection of an ionizing event. When an ionizing particle produces a current avalanche in the tube the resulting discharge pulse continues for some time. If another particle enters the counter tube before the discharge is complete, the pulse it should produce is masked by the preceeding one, and so on for subsequent pulses produced before the tube recovers. Thus, in high radiation fields, the separate pulses are not resolved, and hence cannot be counted. The result is that at high count rates of typically this instrument can paralyze and give false indication of a low count rate or no audible chirp.

Further, these systems require rather large batteries to constantly maintain the applied high voltage bias to the G-M tube which greatly increases the size and weight of the PRM.

Thus, there is a need for an improved PRM of the chirper type which is more reliable, especially in high radiation fields, smaller in size, lighter in weight, and provide long term operation with smaller batteries.

SUMMARY OF THE INVENTION

In view of the above need it is an object of this invention to provide a small, light weight, personal radiation monitor which does not paralyze in high radiation fields.

Other objects and many of the attendant advantages of the present invention will be apparent to those skilled in the art from the following detailed description of a preferred embodiment of this invention together with the accompanying drawings.

In summary, a personal radiation monitor is provided which uses a small G-M tube as the detecting element. The tube is biased at a high voltage by means of a high voltage power supply operating from a small, low voltage battery. The high voltage power supply includes a switching voltage regulator means having an oscillator, a transformer whose primary winding is connected to the output of the voltage regulator means and a voltage multiplying and rectifying circuit connected between the secondary winding of the transformer and the G-M tube. The high voltage supply is monitored by a low-loss sensing network, which provides for a controlled hysteresis of the high voltage output. The high voltage is recharged to a selected maximum value when the current pulses of the G-M tube discharge the high voltage output to a selected minimum value. During the short-period high voltage recharge, an audio transducer connected across to the transformer primary winding of the power supply produces an audible chirp. The rate of the chirps is controlled by the rate of the G-M tube current pulses, which are proportional to the radiation field to which it is exposed. The G-M tube sensor is used in a current sensing mode so that the chirper cannot paralyze in a high radiation field. By use of the switching high voltage power supply to provide a controlled hysteresis of the high voltage applied to the G-M tube from a storage capacitor, power is drawn from the battery only during each short recharge period (typically 10 milliseconds), thereby greatly extending battery life. This low battery drain for normally encountered background radiation fields yields a battery life of over one year of continuous operation with two small 1.5 volt batteries of the flat discharge profile type.

DETAILED DESCRIPTION OF THE PREFERRED EMBODIMENT

Figure 1:
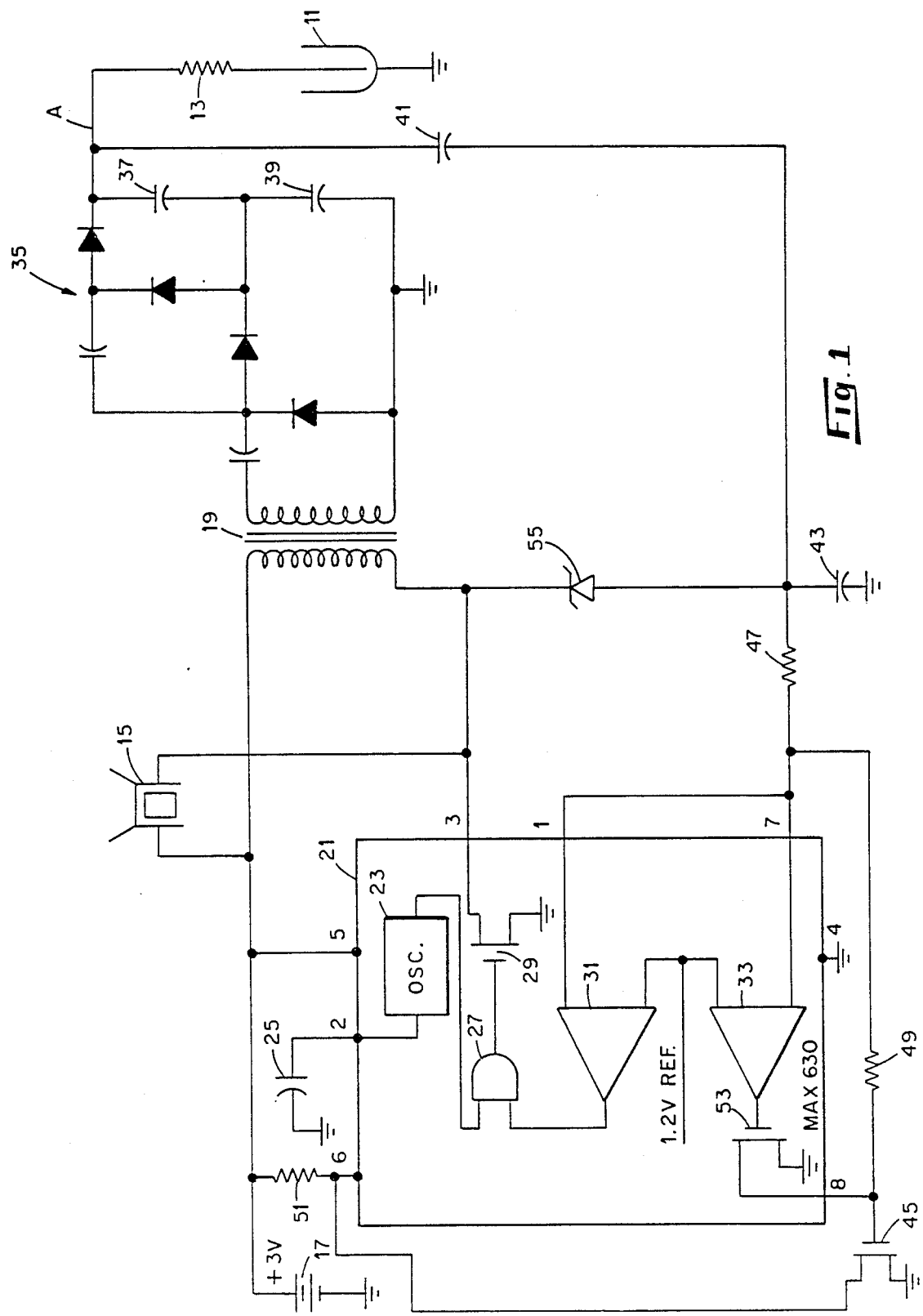
FIG. 1 is a schematic circuit diagram of a chirper type personal radiation monitor according to the present invention.

Referring now to FIG. 1, it will be seen that the personal radiation monitor (PRM) according to the present invention is provided in a very simple design which provides the function of radiation detection of previous device designs which are much larger in size while providing the improvements as set forth above. The circuit may be viewed as a battery powered, regulated, high voltage power supply connected to the anode of a G-M tube 11 through a high ohmic valve, current-limiting resistor 13 (typically 4–5 megohms) with a piezoelectric transducer 15 connected so that it is activated during each high voltage recharging period to produce an audible chirp as will be explained hereinbelow. The G-M tube is a small glass envelope type tube such as the model 4G1000 available from Thompson - CSF Components Corporations, Rutherford, N.J. Battery power is supplied by a 3 volt battery pack 17 which may be composed of two 1.5 volt cells of the flat discharge type, such as conventional mercury, silver oxide, or lithium batteries.

The power supply includes a step-up transformer 19 having its primary winding connected between the positive battery lead and the output (terminal 3) of a switching voltage regulator 21. The switching voltage regulator 21 is preferably an integrated circuit of the low power consumption CMOS type, such as the model MAX 630 CPA, available from Maxim Integrated Products, Inc., Sunnyvale, Calif. This integrated circuit device includes an oscillator 23 whose frequency may be selected by connecting an appropriate value capacitor 25 between the circuit 21 terminal 2 and ground potential. Typically, a capacitance is selected which provides an oscillator frequency that matches the audio transducer 15 resonant frequency, which in this case is 4 KHz for a small piezoelectric transducer 15. The oscillator 23 output is fed through a gate 27 to a switching transistor 29 connected to terminal 3 of the regulator. The audio transducer 15 is connected between the positive battery lead and the integrated circuit 21 output terminal 3 in parallel with the transformer 19 primary winding so that it is activated during the high voltage charging cycle as will be explained.

The gate 27 is controlled by one of a pair of comparators 31 and 33 within the regulator 21 which compares a DC feedback signal proportional to the high voltage applied to the G-M tube 11 with an internal reference voltage of 1.2 volts applied to the reference terminals of comparators 31 and 33. Comparator 31 is connected to enable the gate 27 when the feedback voltage applied to terminals 1 and 7 drops below the 1.2 volt reference and the regulator is powered up, indicating that the high voltage supply has dropped below to a selected minimum value and the recharge cycle is initiated. During the recharge cycle transistor 29 is turned "on" and "off" at the oscillator 23 frequency rate which pulses the battery 17 current through the transformer 19 primary winding. The recharge period continues until the high voltage is restored to a selected maximum value, a period of about 10 milliseconds.

During the high voltage recharge period, the battery current pulses are applied through the transformer 19 to a voltage multiplier and rectifier circuit 35, which in this case is a voltage guadrupler which operates in conjunction with the transformer 19 turns ratio to provide a highly amplified DC voltage output to charge storage capacitors 37 and 39 connected in series with the G-M tube 11. The capacitors are charged to a value such that the anode of G-M tube 11 is raised to +500 volts at the end of a charging cycle. A voltage feedback arrangement is provided in the form of a capacitance voltage divider composed of series connected capacitors 41 and 43 connected between the output of voltage multiplier circuit 35 (line A) and ground potential. The values of capacitors 41 and 43 are chosen such that the voltage across capacitor 43 is a very small fraction of the high voltage applied to the tube 11 (typically 3 volts when the high voltage is charged to 500 volts). These capacitors must be very low leakage capacitors so that the high voltage may e monitored with essentially no leakage loss through the divider to provide the voltage feedback without discharging the high voltage. The feedback voltage is applied to the gate drive electrode of a field effect transistor 45 through resistors 47 and 49. Transistor 45 acts as a power-down switch connected between the input terminal 6 of the switching regulator 21 and ground potential which is further connected to the positive battery lead through a resistor 51. This circuit operates to power-down the switching regulator 21 when the high voltage power supply is not being recharged to conserve battery power as will be explained hereinbelow.

To complete the feedback circuit, a portion of the feedback voltage at the junction of resistors 47 and 49 is applied to separate inputs of comparators 31 and 33 by connecting the junction to terminals 1 and 7 of the regulator 21. The output of comparator 33 is connected to the gate drive of a transistor 53 within regulator 21 which is switched "on" during the high voltage recharge to apply ground potential to output terminal 8 of the regulator which is connected to the gate drive of transistor 45 to prevent transistor 45 from being switched on during the high voltage recharge period.

The selected upper voltage limit of the high voltage supply is regulated by a zener diode 55 connected between the output terminal 3 of the regulator and the capacitance divider junction between capacitors 41 and 43 so that the capacitor 43 is charged to a maximum value of +3 VDC during the recharge cycle which corresponds to the reference feedback voltage for a maximum high voltage of +500 volts on line A.

In operation, when the circuit is activated by connecting the battery pack 17 to the circuit, the switching regulator 21 is powered-up since the transistor 45 is nonconducting. The comparators 31 and 33 are both switched "on", outputs high, enabling gate 27 to pass the oscillator 23 output pulses to the switching transistor 29 which pulses the transformer 19 primary winding and transistor 53 is switched "on" applying ground potential to the gate drive of transistor 45, preventing it from switching "on" during the high voltage charge cycle. The pulses are applied through the transformer 19 to the voltage multiplier 35 which rectifies the amplified pulses and begins to charge the capacitors 37 and 39 and capacitors 41 and 43. When the capacitors are charged to the selected maximum value, in this case +500 VDC on line A (see FIG. 2), the values of resistors 47 and 49 are selected so that the feedback voltage desired from the 3 VDC across capacitor 43 of the feedback voltage divider provides a voltage slightly greater than the 1.2 volt internal reference applied to the comparators 31 and 33. This causes the comparator outputs to switch states disabling gate 27 from passing the oscillator 23 pulses and removes the ground potential clamp from the gate drive of the power-down transistor 45. The feedback voltage applied to the gate drive of transistor 45 through resistors 47 and 49 is at a level which causes transistor 45 to switch "on", applying ground potential to the input terminal 6 of the regulator 21, thereby powering-down the regulator to conserve battery power after the high voltage is charged to the 500 VDC maximum value.

Figure 2:
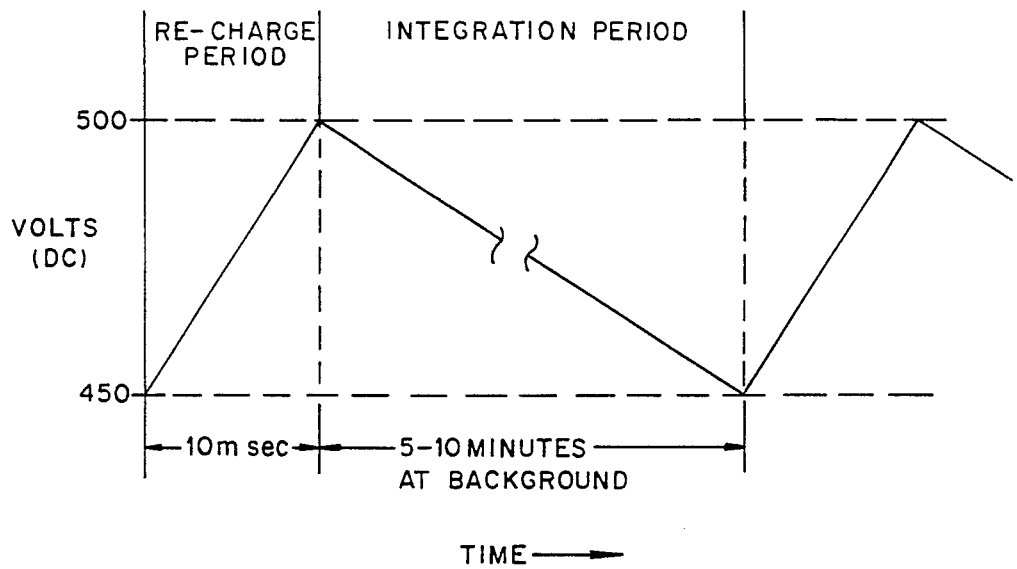
FIG. 2 is a graph of the high voltage output at point A of FIG. 1, illustrating the controlled hysteresis of the high voltage supplied to the G-M detector.

Following the high voltage charging cycle, the charged capacitors 37 and 39 and 41 and 43 act as a charge integrator for the current pulses drawn by the G-M tube 11 radiation sensor. Roughly 100 G-M tube pulses discharges the high voltage by 50 volts. The capacitive divider (capacitors 41 and 43) monitors the high voltage output change and supplies a portion of this change in voltage for the regulator comparators 31 and 33 and power down transistor 45 to monitor. As shown in FIG. 2, when the high voltage, at line A, FIG. 1, is reduced to a value of 450 VDC, the feedback voltage to the power down transistor 45 gate drive (which is the voltage across capacitor 43) is reduced to a value less than the transistor 45 turn-on voltage (approximate 1.0 VDC). This causes transistor 45 to be switched off allowing the regulator 21 to again be powered-up. At this point the comporators 31 and 33 immediately switch states since the feedback voltage is below the 1.2 reference, enabling the gate 27 to pass the oscillator 23 pulses to the transformer 19 and pulling the gate drive of transistor 45 low for the duration of another high voltage recharging cycle. Holding the power-down transistor 45 off during the recharging cycle provides controlled hysteresis of the high voltage supply on line A as illustrated in FIG. 2. As pointed out above, the resistors 47 and 49 are selected so that the capacitor 43 must be charged to approximately 3 VDC to allow the comporators 31 and 33 to switch states, ending the recharge cycle.

During the recharge cycle, the oscillator frequency pulses gated to the switching transistor 29 of the regulator drives the transformer 19 in direct step-up and flyback modes alternately by switching battery current through the primary winding and the high voltage output of the secondary is rectified by the multiplier circuit 35 and charges the high voltage output capacitors 37 and 39. The recharging cycle continues until the zener diode 55 (operating in a pulse sampling mode) charges capacitor 43 to a voltage of approximately +3 VDC. The zener 55 is selected so that when capacitor 43 is recharged to 3 VDC the high voltage, line A, is recharged to +500 VDC which is related by the transformer 19 turns ratio and the breakdown voltage of the zener diode 55.

Further, during the recharge period, which in this case is about 10 milliseconds, the oscillator pulses at terminal 3 of the regulator, activate the audio transducer 15 to produce a short, audible "chirp". The transformer 19 fly-back provides amplification of the 3 volt battery power to drive the audio transducer. Following each recharge cycle the circuit is powered down and the G-M counter pulses are integrated until the high voltage again drops to +450 VDC. The rate at which the high voltage drops to the 450 V minimum depends on the intensity of the radiation field to which the G-M tube is exposed. For background radiation conditions, the integration period following each high voltage recharge periods is in the range of 5 to 10 minutes, as illustrated in FIG. 2. Thus, the chirp rate of the device, which corresponds to the high voltage recharge rate, is directly proportional to the sensed radiation field. The chirp rate sensitivity for the illustrated device is set to be 1.5 (chirps/min)/(milliroentgens/hour). The chirp rate of the circuit is programmable by proper selection of the components over a range of $0.01 \leq X \leq 10$ where X=1.5 (chirp/min)/(milliroentgen/hour). The G-M tube sensor has a wide operating voltage plateau such that the high voltage hysteresis does not appreciably affect its radiation sensitivity.

In the power-down mode (pulse integrating period), the circuit draws only 2.5 microamperes from the battery. During the high voltage recharge cycle it draws 11 milliamperes for the 10 ms recharge period. If the batteries are low this recharge period lengthens, thus providing an indication of the battery condition at every chirp. A noticeable increase in the length of the chirp period is an indication to the user that the battery needs to be replaced. The battery drain for normally encountered background radiation fields yields a battery life of over one year continuous operation.

Thus it will be seen that a very inexpensive, simple and reliable chirper type personal radiation monitor has been provided which can be packaged in a very small volume of about 1.8 cubic inches with a total weight of approximately one ounce.

Although the invention has been illustrated by means of a preferred embodiment of the invention, various modifications and changes made be made therein without departing from the spirit and scope of the invention as set forth in the following claims. For example, the G-M tube radiation sensor may be modified to detect thermal neutrons as well as Beta and Gamma radiation by providing an indium foil wrap about the outer glass envelope of the G-M tube 11 which produces secondary gamma emissions which are detectable by the G-M tube.

I claim:

1. A personal radiation monitor for detecting ionizing radiation, comprising:
   an ionizing radiation detector means having an anode and a cathode electrodes, said cathode electrode being connected to ground potential;
   a low voltage DC power source;
   a high voltage capacitive charge storing means coupled to said anode of said radiation detector for applying a high voltage bias to said anode of said detector;
   a high voltage generating means for generating and applying a selected high voltage DC charge to said capacitive charge storage means from said low voltage DC power source in response to a feedback signal proportional to the stored charge voltage of said capacitive charge storage means to repeatedly recharge said capacitive charge storage means to a selected maximum high voltage level during a charging period each time said capacitance storage means is discharged to a selected minimum high voltage level by current pulses generated in said radiation detector in response to the detection of ionizing radiation therein;
   a feedback signal generating means for generating said feedback signal proportional to the voltage level of said capacitive storage means and applying said feedback signal to said high voltage generating means; and
   an audio signal generating means for generating an audible signal pulse each time said capacitive storage means is recharged as an indication of the ionizing radiation field intensity being sensed by said detector means, whereby the audible pulse rate is proportional to the ionizing radiation field intensity being detected.

2. A personal radiation monitor as set forth in claim 1 wherein said ionizing radiation detector means is a G-M tube having an anode and a cathode electrodes, said cathode electrode being connected to ground potential and further including a current limiting resistor connected between said anode electrode and said high voltage capacitive storage means.

3. A personal radiation monitor as set forth in claim 2 wherein said high voltage generating means includes a step-up transformer having a primary winding and a secondary winding, a high voltage rectifying means connected between said secondary winding of said transformer and said high voltage capacitor storage means for generating and applying a high voltage DC charge current to said capacitive storage means during said charging period and a switching means responsive to said feedback signal for applying current pulses from said low voltage DC power source to said primary winding of said transformer at a selected frequency during said charging period.

4. A personal radiation monitor as set forth in claim 3 wherein said audio signal generating means includes a piezoelectric audio transducer connected in parallel with said primary winding of said transformer.

5. A personal radiation monitor as set forth in claim 4 wherein said feedback signal generating means includes a capacitance voltage divider means having first and second series connected capacitors connected in parallel with said detector means for sensing the high voltage bias applied to said detector means and providing said feedback signal in the form of a low voltage signal at the junction of said first and second capacitors thereof proportional to the high voltage bias applied to said detector means.

* * * * *